(12) United States Patent
Kahle et al.

(10) Patent No.: US 6,325,383 B1
(45) Date of Patent: Dec. 4, 2001

(54) SEALING ARRANGEMENT

(75) Inventors: Otto Kahle, Hamburg; Hans Werther, Seevetal, both of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/202,486

(22) PCT Filed: Jun. 16, 1997

(86) PCT No.: PCT/EP97/03125

§ 371 Date: Aug. 20, 1999

§ 102(e) Date: Aug. 20, 1999

(87) PCT Pub. No.: WO97/48924

PCT Pub. Date: Dec. 24, 1997

(30) Foreign Application Priority Data

Jun. 17, 1996 (DE) .......................................... 296 10 628 U

(51) Int. Cl.⁷ ...................................................... F16J 15/40
(52) U.S. Cl. ........................ 277/436; 277/437; 277/549; 277/551; 277/560
(58) Field of Search ..................................... 277/435, 436, 277/437, 448, 549, 551, 552, 560, 561, 582

(56) References Cited

U.S. PATENT DOCUMENTS

| 2,293,564 | * | 8/1942 | Schnell | 277/436 |
| 4,611,931 | | 9/1986 | Brandenstein et al. | |
| 5,261,677 | * | 11/1993 | Gotoh et al. | 277/549 |
| 5,348,313 | * | 9/1994 | Pawlakowitsch | 277/549 |

FOREIGN PATENT DOCUMENTS 87 04 249    6/1987 (DE) .

* cited by examiner

Primary Examiner—Anthony Knight
Assistant Examiner—Enoch Peavey
(74) Attorney, Agent, or Firm—Kenyon & Kenyon

(57) ABSTRACT

A sealing arrangement having two machine parts which are moved relative to one another and which enclose a sealing ring, the sealing arrangement having a radially internal retaining part, a radially external sealing part, and a resilient connecting part joining these two. The sealing part is pre-stressed with respect to the radially outward opposing sealing surface exclusively by the elongation of the holding part while the diameter of the sealing part remains unchanged.

16 Claims, 1 Drawing Sheet

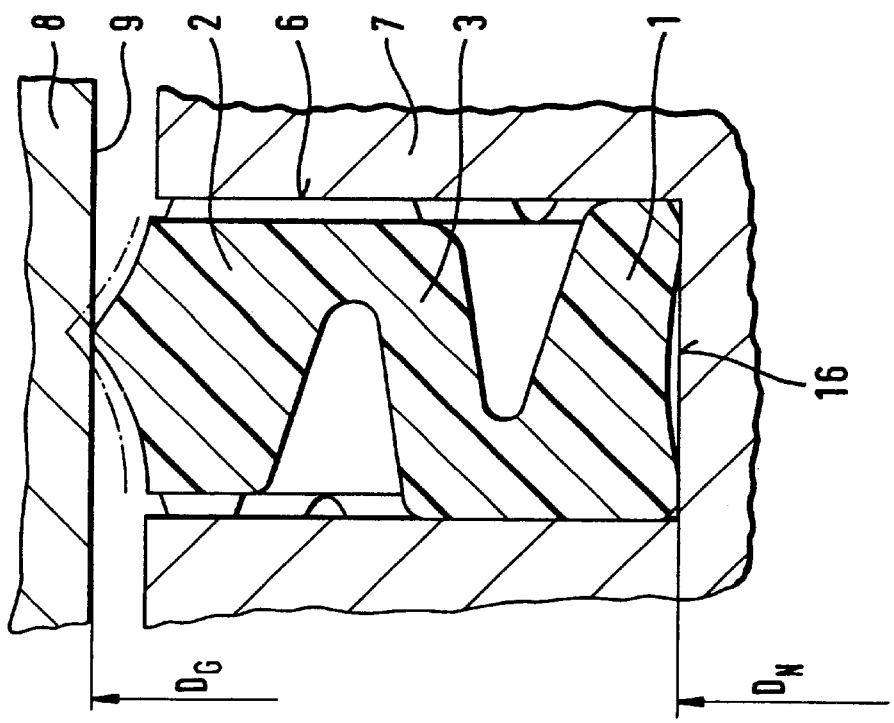
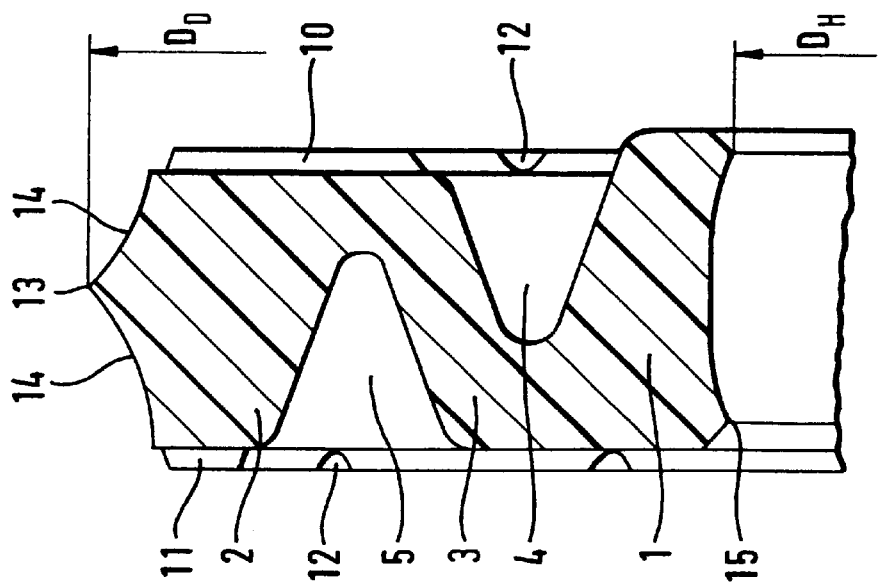

SEALING ARRANGEMENT

BACKGROUND OF THE INVENTION

The present invention relates to a sealing arrangement having two machine parts which are moved relative to one another axially and/or in a rotary movement, and which enclose a sealing ring between concentric sealing surfaces. This ring is composed of an elastic material and has a retaining part positioned radially internally, a sealing part positioned radially externally, and a resilient connecting part joining these two. The retaining part provides a static seal against the inner machine part, and fits under prestressing against the inner sealing surface, which will also be called the base sealing surface hereafter. To cause prestressing, the inner diameter of the retaining part is smaller than that of the base sealing surface. The sealing part is applied under prestressing against the outer opposing sealing surface, which is movable with respect to the sealing part. The retaining part and sealing part essentially lie in the same radial plane. In general, the sealing ring is mounted in a retaining groove in the inner machine part.

Known sealing arrangements of this kind (e.g., U.S. Pat. No. 4,611,931; the present applicant's "Airzet Gasket" brochure) achieve resilience of the connecting part in combination with a single-piece configuration of the sealing ring by having two groove-shaped notches radially offset from one another, which create a Z-shaped profile between the retaining part and the sealing part. Consequently the pressure to be sealed off, being present in one of these grooves, is exerted against the back of the sealing part and thus increases the sealing compression proportionally to the pressure that is to be sealed off. In order that the pressure to be sealed off may reach this groove, the front faces of the sealing part have protrusions or cross-sectional areas of passage that prevent the full surface of the sealing part from being applied like a barrier against the walls of the groove receiving the sealing ring. The proportionality between the sealing compression and the pressure to be sealed off makes it possible to keep the initial prestressing on the sealing part low, thus also keeping static friction (the "slip-stick effect") low. All the same, a certain initial sealing compression must be present and is achieved by elastic prestressing. In known sealing arrangements, this prestressing is accomplished in that the circumferential surface of the sealing part intended to be applied against the opposing sealing surface is given a diameter somewhat greater than the diameter of the opposing sealing surface. Consequently, after installation, the sealing part is crushed in the circumferential direction. Thus the sealing part tends to assume a serpentine shape within the groove holding the sealing ring. Hence the relative position of the sealing part, as viewed in a longitudinal section, is not uniform at all points of the circumference, and therefore the sealing effect is also variable and to some extent less than optimum. Since the prestressing of the sealing part must be great enough to guarantee a tight seal even at those points where the conditions for such tightness are least favorable, the prestressing must be greater than would be necessary if the sealing part had an optimum orientation everywhere.

A known wiper ring (German Patent U-8704249) is composed of a radially internal retaining part, a radially external wiper, and a resilient connecting part joining these parts. The wiper has a lip that performs the wiping function and also, if necessary, sealing functions, and for this purpose is prestressed against the opposing sealing surface by being deformed to a diameter less than its diameter in the unstressed state. So that this lip remains in the correct position with respect to the opposing sealing surface during operation, the wiper is additionally provided with a guide ring whose cylindrical circumferential surface has the same diameter as the opposing sealing surface and rests against the latter surface. Since such a support ring generates additional friction against the opposing sealing surface, it is not applicable for sealing rings that are intended to have a low initial friction against the opposing sealing surface.

SUMMARY OF THE INVENTION

The present invention is therefore based on the objective of improving the conditions for a uniform position against the opposing sealing surface all around the circumference of the sealing part, in sealing arrangements of the type noted above.

The solution according to the present invention consists in that the prestressing of the sealing part is essentially generated by the elastic elongation of the retaining part. Hence the diameter of the opposing sealing surface is approximately as great as the diameter, in the unstressed state, of the portion of the sealing part that works together with the opposing sealing surface. The retaining part is so greatly elongated that via the connecting part it presses the sealing part against the opposing sealing surface, without the sealing part being significantly elongated or crushed in comparison to its unstressed state. During the mounting of the sealing ring on the base sealing surface of the inner machine part, the sealing part undergoes an elongation which is subsequently at least partially reversed when the inner machine part having the sealing ring is inserted into the external machine part. A circumferential crushing of the sealing part, which might cause it to undergo a serpentine deformation, is thus avoided. The diameter of the opposing sealing surface is preferably not less than the unstressed diameter of the sealing part.

Since the elastic prestressing of the sealing part may be less than in corresponding known arrangements, the configuration of the sealing edge assumes a greater importance. This edge may expediently be formed between two inclined surfaces which, viewed in a longitudinal section, have approximately a roof-like configuration, in a manner that is known in itself. To ensure a close fit of the sealing edge against the opposing sealing surface via an appropriate deformation, the inclined surfaces are arranged at a relatively steep angle with respect to the opposing sealing surface, expediently having an open angle of more than 20 degrees, and preferably more than 25 degrees, on both sides. So that the sealing part will nevertheless be sufficiently compact to offer adequate deformation resistance to the forces acting upon it, and in particular so that it will not be too extensively folded over by frictional forces, the inclined surfaces expediently have a concave configuration, as viewed in a longitudinal section. Only in the vicinity of the sealing edge do they have a steep inclination with respect to the opposing sealing surface; in the remaining area they have a flatter inclination. The configuration of the sealing edge and the inclined surfaces are themselves noteworthy.

BRIEF DESCRIPTION OF THE DRAWINGS

The invention is explained below with reference to the drawing, which illustrates an advantageous exemplary embodiment:

FIG. 1 shows a radial cross-sectional view of the profile of the sealing ring according to the present invention, in the unstressed state, and FIG. 2 shows it in the installed state.

DETAILED DESCRIPTION

The sealing ring includes a retaining part 1, a sealing part 2 and a Z-shaped connecting part 3 which is positioned between these two parts and whose shape is defined by grooves 4 and 5. The sealing ring is intended for installation in a groove 6 in a piston 7 not shown in further detail, associated with a cylinder 8, of which only a part of opposing sealing surface 9 is shown. All parts shown are bodies of revolution around a shared axis lying outside the sheet of the drawing. Groove base 16 of the groove constitutes the base sealing surface upon which retaining part 1 rests sealingly, under prestressing. On its surface that works together with groove base 16, retaining part 1 is equipped with two sealing edges 15 to afford a better seal.

In the installed state, retaining part 1 and sealing part 2 of the sealing ring are positioned radially one inside the other; in other words, their front faces lie in the same radial plane, coinciding with the walls of groove 6. Here the front faces of sealing part 2 are formed by protruding ridges 10 and 11, between which cross-sectional areas of passage 12 are arranged in order that the media on either side of the sealing ring may have access to grooves 4 and 5. This is a prerequisite in order for the back side of sealing part 2 to be exposed to the pressure differential that is to be sealed off.

Sealing part 2 acts together with opposing sealing surface 9 via a sealing edge 13 defined by two inclined surfaces 14 which are more steeply inclined with respect to opposing sealing surface 9 in their zones near sealing edge 13 than they are in their zones farther away from that edge; consequently, they have a concave configuration.

Thus sealing part 2 has a greater average radial thickness than if inclined surfaces 14 had been configured in a straight line having the same inclination as they assume in the immediate vicinity of sealing edge 13. Hence this part is stiffer, in particular with respect to the frictional forces that attempt to twist it (fold it over) around the circumferential axis and that act on sealing edge 13. Sealing edge 13 may be configured in a rounded-off shape. At the least it undergoes a rounding off or flattening due to prestressing in the installed state (FIG. 2).

According to the present invention, the diameter $D_G$ of opposing sealing surface 9 is approximately as great as or greater than the diameter $D_D$ of the sealing edge of sealing part 2. By contrast, the diameter $D_N$ of groove base 16 of groove 6 is considerably greater than the diameter $D_H$ of the surface of retaining part 1 of the sealing ring, with which it works together. That is, the diameters and rigidities of connecting part 3 and sealing part 2 are dimensioned such that after the sealing ring is mounted in groove 6, sealing part 2 is oversized compared to opposing sealing surface 9, by an amount shown by a dash-dotted line in FIG. 2, and this amount is great enough that after mounting in opposing sealing surface 9 and the resulting deformation, the sealing part is compressed back to a dimension approximately equivalent to its dimension in the unstressed state, or even a bit greater. This avoids circumferential compressive strains in sealing part 2, such as would lead to the adverse effects described at the outset.

What is claimed is:

1. A sealing arrangement comprising:
   a first machine part having an outer sealing surface having a diameter;
   a second machine part that is movable relative to the first machine part, the second machine part containing a groove having a base surface having a diameter, the base surface providing the second machine part with an axially extending inner surface that is concentric with the sealing surface of the first machine part;
   a sealing ring that is enclosed by the first and second machine parts, the sealing ring comprising a radially internal retaining part having an inner diameter, a external sealing part having an outer sealing surface, and a resilient connecting part joining these two, between the concentric sealing surfaces of which the inner, base sealing surface, is immovable relative to the sealing ring and has a greater diameter ($D_N$) than the inner diameter ($D_H$) of the retaining part in its unstressed state, and the outer, opposing sealing surface, which is movable relative to the sealing ring, is acted upon under prestressing by the outer circumference of the sealing part, wherein the prestressing of the sealing part is essentially generated by the elongation of the retaining part that is sustained by the relative difference between the inner diameter ($D_H$) of the retaining part and the diameter ($D_N$) of the inner, base sealing surface of the groove.

2. The sealing arrangement as recited in claim 1, wherein the diameter ($D_G$) of the sealing surface of the first part is not substantially less than the outer diameter ($D_D$) of the sealing part in the unstressed state.

3. The sealing arrangement as recited in claim 2, wherein the sealing part forms at least one sealing edge between two inclined surfaces which, viewed in a longitudinal section, intersect each other at an angle.

4. The sealing arrangement as recited in claim 1, wherein the sealing part forms at least one sealing edge between two inclined surfaces which, viewed in a longitudinal section, intersect each other at an angle.

5. The sealing arrangement as recited in claim 4, wherein the sealing edge is rounded off.

6. The sealing arrangement as recited in claim 5, wherein the inclined surfaces, viewed in a longitudinal section, are concave in order to increase stiffness of the sealing part.

7. The sealing arrangement as recited in claim 4, wherein the inclined surfaces, viewed in a longitudinal section, are concave in order to increase stiffness of the sealing part.

8. A sealing arrangement comprising:
   a first machine part having a sealing surface;
   a second machine part that is moveable relative to the first machine part, the second machine part containing a groove having a base surface, the base surface providing the second machine part with an inner base sealing surface that is concentric with the sealing surface of the first machine part; and,
   a sealing ring in contact with the inner base sealing surface and the sealing surface of the first machine part, the sealing ring comprising a radially internal retaining part having an inner diameter, a radially external sealing part having an outer sealing surface, and a resilient connecting part joining the retaining part and the sealing part, wherein the inner base sealing surface is stationary relative to the base surface and the outer sealing surface is moveable relative to the retaining part,
   the outer sealing surface being prestressed by the elongation of the retaining part that is sustained by the relative difference between the inner diameter ($D_H$) of the retaining part and the diameter ($D_N$) of the inner, base sealing surface of the groove,
   the sealing part moveable along an axis shared by both the retaining part and the sealing part.

9. The sealing arrangement of claim 8 wherein the retaining part and the sealing part are concentric with one another.

10. A sealing system comprising:
    a first machine part having a sealing surface;
    a second machine part having a groove; and, a sealing ring located within the groove,
  the seal ring having a retaining part with an inner diameter less than the diameter of the groove, a sealing part, and a connecting part, the sealing part having a first side and a second side,
  the connecting part connecting the sealing part and the retaining part,
  the retaining part located in the groove and sealably engaging the groove,
  the first side of the sealing part facing the sealing surface,
  the second side of the sealing part in fluid communication with a portion of the sealing surface,
  the first side of the sealing part sealably engaging the sealing surface,
  the sealing part being urged toward the sealing surface by the sustained elastic elongation of the retaining part.

11. A sealing arrangement comprising:
a first machine part having an outer sealing surface having a diameter;
a second machine part that is movable relative to the first machine part, the second machine part containing a groove having a base surface having a diameter, the base surface providing the second machine part with an axially extending inner surface that is concentric with the sealing surface of the first machine part;
a sealing ring that is enclosed by the first and second machine parts, the sealing ring comprising a radially internal retaining part having an inner diameter, a radially external sealing part having an outer sealing surface, and a resilient connecting part joining these two, between the concentric sealing surfaces of which the inner, base sealing surface, is immovable relative to the sealing ring and has a greater diameter ($D_N$) than the inner diameter ($D_H$) of the retaining part in its unstressed state, and the outer, opposing sealing surface, which is movable relative to the sealing ring, is acted upon under prestressing by the outer circumference of the sealing part, wherein the prestressing of the sealing part is essentially generated by the elongation of the retaining part that is sustained by the relative difference between the inner diameter ($D_H$) of the retaining part and the diameter ($D_N$) of the inner, base sealing surface of the groove,
wherein the sealing ring has a Z-shaped cross-section.

12. A sealing arrangement comprising:
a first machine part having an outer sealing surface having a diameter;
a second machine part that is movable relative to the first machine part, the second machine part containing a groove having a base surface having a diameter, the base surface providing the second machine part with an axially extending inner surface that is concentric with the sealing surface of the first machine part;
a sealing ring that is enclosed by the first and second machine parts, the sealing ring comprising a radially internal retaining part having an inner diameter, a radially external sealing part having an outer sealing surface, and a resilient connecting part joining these two, between the concentric sealing surfaces of which the inner, base sealing surface, is immovable relative to the sealing ring and has a greater diameter ($D_N$) than the inner diameter ($D_H$) of the retaining part in its unstressed state, and the outer, opposing sealing surface, which is movable relative to the sealing ring, is acted upon under prestressing by the outer circumference of the sealing part, wherein the prestressing of the sealing part is essentially generated by the elongation of the retaining part that is sustained by the relative difference between the inner diameter ($D_H$) of the retaining part and the diameter ($D_N$) of the inner, base sealing surface of the groove,
wherein the connecting part is defined by notches radially offset from one another.

13. A sealing arrangement comprising:
a first machine part having a sealing surface;
a second machine part that is moveable relative to the first machine part, the second machine part containing a groove having a base surface, the base surface providing the second machine part with an inner base sealing surface that is concentric with the sealing surface of the first machine part; and,
a sealing ring in contact with the inner base sealing surface and the sealing surface of the first machine part, the sealing ring comprising a radially internal retaining part having an inner diameter, a radially external sealing part having an outer sealing surface, and a resilient connecting part joining the retaining part and the sealing part, wherein the inner base sealing surface is stationary relative to the base surface and the outer sealing surface is moveable relative to the retaining part,
  the outer sealing surface being prestressed by the elongation of the retaining part that is sustained by the relative difference between the inner diameter ($D_H$) of the retaining part and the diameter ($D_N$) of the inner, base sealing surface of the groove,
  the sealing part moveable along an axis shared by both the retaining part and the sealing part,
wherein the sealing ring has a Z-shaped cross-section.

14. A sealing arrangement comprising:
a first machine part having a sealing surface;
a second machine part that is moveable relative to the first machine part, the second machine part containing a groove having a base surface, the base surface providing the second machine part with an inner base sealing surface that is concentric with the sealing surface of the first machine part; and,
a sealing ring in contact with the inner base sealing surface and the sealing surface of the first machine part, the sealing ring comprising a radially internal retaining part having an inner diameter, a radially external sealing part having an outer sealing surface, and a resilient connecting part joining the retaining part and the sealing part, wherein the inner base sealing surface is stationary relative to the base surface and the outer sealing surface is moveable relative to the retaining part,
  the outer sealing surface being prestressed by the elongation of the retaining part that is sustained by the relative difference between the inner diameter ($D_H$) of the retaining part and the diameter ($D_N$) of the inner, base sealing surface of the groove,
  the sealing part moveable along an axis shared by both the retaining part and the sealing part,
wherein the connecting part is defined by notches radially offset from one another.

15. A sealing system comprising:
a first machine part having a sealing surface;
a second machine part having a groove; and, a sealing ring located within the groove,
  the seal ring having a retaining part with an inner diameter less than the diameter of the groove, a sealing part, and a connecting part, the sealing part having a first side and a second side,
  the connecting part connecting the sealing part and the retaining part,
  the retaining part located in the groove and sealably engaging the groove,
  the first side of the sealing part facing the sealing surface;
  the second side of the sealing part in fluid communication with a portion of the sealing surface,
  the first side of the sealing part sealably engaging the sealing surface,
  the sealing part being urged toward the sealing surface by the sustained elastic elongation of the retaining part,
wherein the sealing ring has a Z-shaped cross-section.

16. A sealing system comprising:
a first machine part having a sealing surface;
a second machine part having a groove; and,
a sealing ring located within the groove,
  the seal ring having a retaining part with an inner diameter less than the diameter of the groove, a sealing part, and a connecting part, the sealing part having a first side and a second side,
  the connecting part connecting the sealing part and the retaining part,
  the retaining part located in the groove and sealably engaging the groove,
  the first side of the sealing part facing the sealing surface;
  the second side of the sealing part in fluid communication with a portion of the sealing surface,
  the first side of the sealing part sealably engaging the sealing surface,
  the sealing part being urged toward the sealing surface by the sustained elastic elongation of the retaining part,
wherein the connecting part is defined by notches radially offset from one another.

* * * * *

UNITED STATES PATENT AND TRADEMARK OFFICE
CERTIFICATE OF CORRECTION

PATENT NO.   : 6,325,383 B1  
DATED        : December 4, 2001  
INVENTOR(S)  : Kahle et al.

It is certified that error appears in the above-identified patent and that said Letters Patent is hereby corrected as shown below:

Column 4,
Line 2, change "external" to -- radially external --;

Signed and Sealed this

Fifteenth Day of July, 2003

JAMES E. ROGAN
*Director of the United States Patent and Trademark Office*